(12) United States Patent
Imagaki et al.

(10) Patent No.: US 7,779,959 B2
(45) Date of Patent: Aug. 24, 2010

(54) ELECTRIC POWER STEERING APPARATUS

(75) Inventors: Susumu Imagaki, Osaka (JP); Wataru Yamada, Osaka (JP)

(73) Assignee: JTEKT Corporation, Osaka (JP)

( * ) Notice: Subject to any disclaimer, the term of this patent is extended or adjusted under 35 U.S.C. 154(b) by 318 days.

(21) Appl. No.: 11/889,276

(22) Filed: Aug. 10, 2007

(65) Prior Publication Data

US 2008/0035416 A1 Feb. 14, 2008

(30) Foreign Application Priority Data

Aug. 11, 2006 (JP) .............................. 2006-219600

(51) Int. Cl.
*B62D 5/04* (2006.01)
(52) U.S. Cl. ........................... 180/444; 74/425
(58) Field of Classification Search ................ 180/443, 180/444, 446; 74/425, 409, 443
See application file for complete search history.

(56) References Cited

U.S. PATENT DOCUMENTS

| | | | | |
|---|---|---|---|---|
| 4,784,234 A * | 11/1988 | Naito et al. | ................. | 180/444 |
| 6,527,642 B1 * | 3/2003 | Arai et al. | .................... | 464/104 |
| 6,832,662 B2 * | 12/2004 | Shimizu et al. | ............. | 180/444 |
| 7,213,677 B2 * | 5/2007 | Nakamura et al. | .......... | 180/444 |
| 2001/0040067 A1 * | 11/2001 | Murakami et al. | .......... | 180/444 |
| 2002/0046897 A1 * | 4/2002 | Kurokawa et al. | .......... | 180/444 |
| 2004/0149512 A1 * | 8/2004 | Tsutsui et al. | ............... | 180/443 |
| 2005/0161277 A1 * | 7/2005 | Bock et al. | .................. | 180/400 |

FOREIGN PATENT DOCUMENTS

JP 2005-280589 10/2005

* cited by examiner

*Primary Examiner*—Anne Marie M. Boehler
(74) *Attorney, Agent, or Firm*—Rabin & Berdo, PC (57) ABSTRACT

An electric power steering apparatus comprises a driving gear driven by an electric motor for steering assist and a driven gear meshed with the driving gear. A steering shaft is rotated along with the driven gear. The steering shaft is rotatably supported by a first bearing and a second bearing. An urging member is arranged in a recess provided in a housing. The urging member urges at least one of the first bearing and the second bearing in a direction in which a center-to-center distance between the driving gear and the driven gear increases.

15 Claims, 6 Drawing Sheets

ELECTRIC POWER STEERING APPARATUS

BACKGROUND OF THE INVENTION

1. Field of the Invention

The present invention relates to an electric power steering apparatus.

2. Description of Related Art

An electric power steering apparatus has an electric motor for generating a steering assist force and a reduction gear mechanism for decelerating the rotation of an output shaft of the electric motor. The reduction gear mechanism has a worm serving as a driving gear connected to the output shaft of the electric motor and a worm wheel serving as a driven gear meshed with the worm. The worm wheel is fixed to a steering shaft. The steering shaft is rotatably supported by a bearing. The bearing is held in a bearing holding hole of a housing (see Japanese Unexamined Patent Publication No. 2005-280589).

In the electric power steering apparatus, a proper amount of backlash is usually provided between the worm and the worm wheel at the time of factory shipment. When the electric power steering apparatus is employed for a long time period, however, the inner diameter of the bearing holding hole is enlarged. As a result, a clearance may occur between the bearing and the bearing holding hole. When the clearance occurs, the amount of backlash between the worm and the worm wheel is increased. As a result, a tooth striking sound is increased, so that noises become a problem.

When the amount of thermal expansion of the worm wheel due to temperature rise is larger than the amount of thermal expansion of the housing, the amount of backlash is decreased as the temperature rises. Therefore, a rotational resistance between the worm and the worm wheel is increased, resulting in a degraded steering feeling.

An object of the present invention is to provide an electric power steering apparatus capable of maintaining low noises for a long time period and superior in a steering feeling irrespective of temperature changes.

SUMMARY OF THE INVENTION

In order to attain the above-mentioned object, in a preferred aspect of the present invention, there is provided an electric power steering apparatus comprising a driving gear driven by an electric motor for steering assist, a driven gear meshed with the driving gear, and a steering shaft rotated along with the driven gear. The electric power steering apparatus comprises a first bearing and a second bearing for rotatably supporting the steering shaft, a housing accommodating the driving gear, the driven gear, the first bearing and the second bearing, and an urging member arranged in a recess provided in the housing for urging at least one of the first bearing and the second bearing in a direction in which a center-to-center distance between the driving gear and the driven gear increases.

According to this aspect, the urging member urges at least one of the first bearing and the second bearing in the direction in which the center-to-center distance increases. As a result, the urged bearing is pressed against an inner surface of a corresponding bearing holding hole and positioned therein.

On the other hand, a direction in which the bearing is pressed by a reaction force of mesh from the driving gear received by the driven gear is parallel to the direction in which the center-to-center distance increases. Even if a very small clearance exists between the inner periphery of the bearing holding hole and the bearing, therefore, the position of the bearing is prevented from being undesirably shifted within the bearing holding hole. As a result, the amount of backlash between the driving gear and the driven gear can be properly maintained.

The urging member urges at least one of the first bearing and the second bearing in the direction in which the center-to-center distance increases. Even when the amount of expansion of the driven gear due to temperature rise is larger than the amount of expansion of the housing, therefore, the amount of backlash between the driving gear and the driven gear is not excessively reduced. Consequently, the increase in rotational resistance between the driving gear and the driven gear can be restrained irrespective of temperature changes. As a result, a good steering feeling can be obtained.

DETAILED DESCRIPTION OF THE PREFERRED EMBODIMENT

Embodiments of the present invention will be described in detail while referring to the accompanying drawings.

Figure 1:
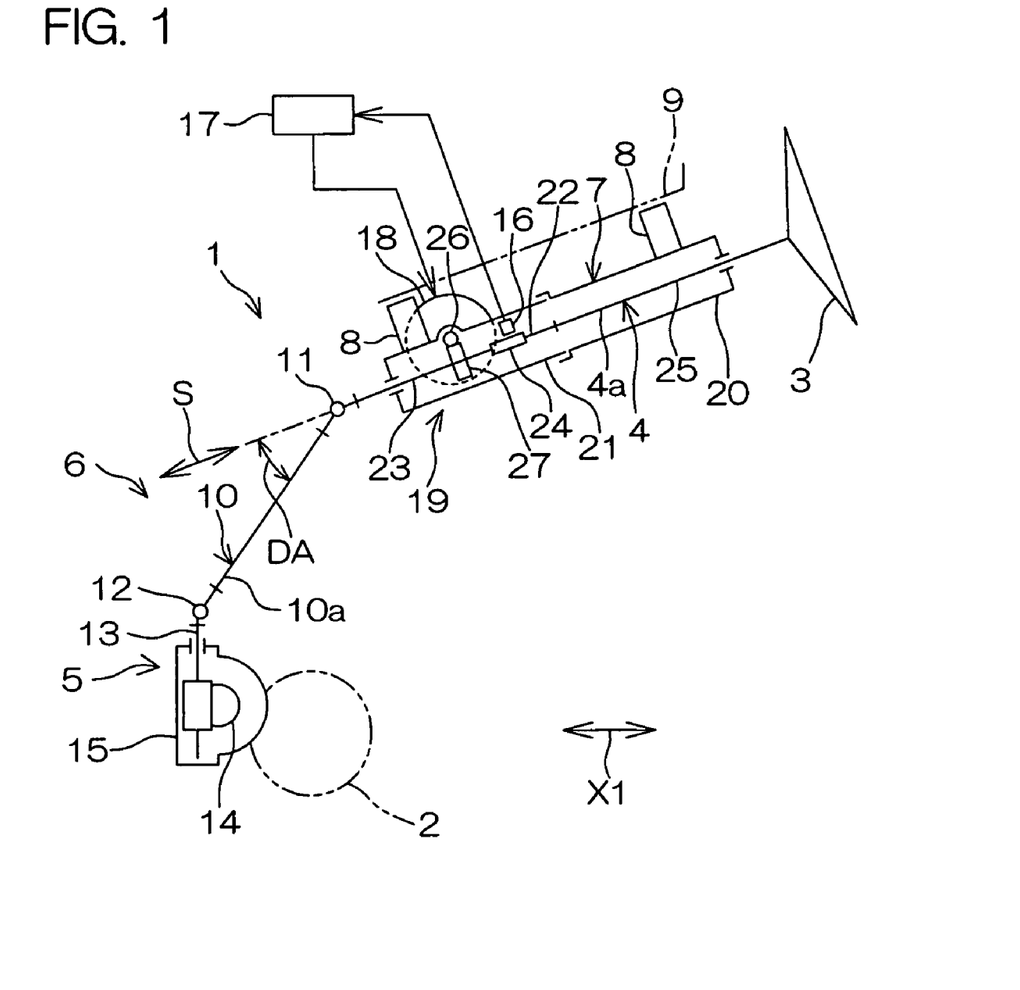
FIG. 1 is a schematic side view of the general configuration of an electric power steering apparatus according to a first embodiment of the present invention.

FIG. 1 is a schematic side view showing the general configuration of an electric power steering apparatus according to a first embodiment of the present invention. Referring to FIG. 1, an electric power steering apparatus 1 comprises a first steering shaft 4 for transmitting a steering torque applied to a steering wheel 3 serving as a steering member for steering a steerable wheel 2, and a steering mechanism 5 composed of a rack-and-pinion mechanism, for example, for steering the steerable wheel 2 by a steering torque from the first steering shaft 4.

Furthermore, the electric power steering apparatus 1 comprises an intermediate shaft 6 provided between the first steering shaft 4 and the steering mechanism 5. The intermediate shaft 6 functions as a shaft coupling for transmitting rotation between the first steering shaft 4 and the steering mechanism 5.

The first steering shaft 4 is arranged in such a manner that the center axis of the first steering shaft 4 is diagonal in a front-and-rear direction X1 of a vehicle and the steering wheel 3 is positioned on the upper side.

The first steering shaft 4 is inserted through a steering column 7, and is rotatably supported by the steering column 7. The steering column 7 is supported on a vehicle body 9 through a bracket 8. The steering wheel 3 is connected to one end of the first steering shaft 4. The steering wheel 3 is rotated along with the first steering shaft 4. The intermediate shaft 6 is connected to the other end of the first steering shaft 4.

The intermediate shaft 6 has a power transmission shaft 10, a universal joint 11 provided at one end of the intermediate shaft 6, and a universal joint 12 provided at the other end of the intermediate shaft 6. Although the power transmission shaft 10 is configured as a non-telescopic shaft having a predetermined length in its axial direction, it may be configured as a telescopic shaft, as described later.

The steering mechanism 5 has a pinion shaft 13 connected to the universal joint 12 of the intermediate shaft 6, a rack bar 14 serving as a second steering shaft extending in a transverse direction (a direction perpendicular to a straight direction) of the vehicle, and a housing 15 for supporting the pinion shaft 13 and the rack bar 14. Pinion teeth of the pinion shaft 13 and rack teeth of the rack bar 14 are meshed with each other.

When the steering wheel 3 is steered, a steering torque produced thereby is transmitted to the steering mechanism 5 through the first steering shaft 4 or the like. This allows the steerable wheel 2 to be steered.

The electric power steering apparatus 1 can obtain a steering assist force depending on the steering torque. That is, the electric power steering apparatus 1 has a torque sensor 16 for detecting the steering torque, an ECU (Electronic Control Unit) 17 serving as a control section, an electric motor 18 for steering assist, and a reduction gear mechanism 19 serving as a gear device.

In the present embodiment, the electric motor 18 and the reduction gear mechanism 19 are provided in relation to the steering column 7. The steering column 7 has a column tube 20 and a housing 21. The housing 21 accommodates and supports the torque sensor 16, and supports the electric motor 18. The housing 21 constitutes a part of the reduction gear mechanism 19.

The first steering shaft 4 has an input shaft 22, an output shaft 23, and a torsion bar 24. The input shaft 22, the output shaft 23, and the torsion bar 24 are made of steel. A lower part of the first steering shaft 4 in an axial direction is divided into the input shaft 22 and the output shaft 23. The input shaft 22 and the output shaft 23 are coaxially connected to each other through the torsion bar 24.

The input shaft 22 is connected to the steering wheel 3 through a connection shaft 25 serving as an upper part of the first steering shaft 4 in the axial direction. The output shaft 23 is connected to the pinion shaft 13 through the intermediate shaft 6. When the steering torque is inputted to the input shaft 22, the torsion bar 24 is subjected to elastically torsional deformation, so that the input shaft 22 and the output shaft 23 are rotated relative to each other.

The torque sensor 16 is provided in relation to the torsion bar 24 of the first steering shaft 4. The torque sensor 16 detects a torque on the basis of the amount of relative rotational displacement between the input shaft 22 and the output shaft 23 through the torsion bar 24. The results of the torque detection performed by the torque sensor 16 are given to the ECU 17.

The ECU 17 controls the electric motor 18 on the basis of the above-mentioned results of the torque detection, the results of vehicle speed detection given from a vehicle speed sensor (not shown) and the like.

The reduction gear mechanism 19 comprises a worm gear mechanism, for example. That is, the reduction gear mechanism 19 has a worm shaft 26 serving as a driving gear and a worm wheel 27 serving as a driven gear. The worm shaft 26 is driven by the electric motor 18. The worm shaft 26 is meshed with the worm wheel 27. The worm wheel 27 is connected so as to be rotatable along with the output shaft 23.

When the steering wheel 3 is operated, the steering torque is detected by the torque sensor 16. The electric motor 18 produces a steering assist force depending on the results of the torque detection, the results of the vehicle speed detection, and the like. The steering assist force is transmitted to the pinion shaft 13 through the reduction gear mechanism 19, and is transmitted to the steering mechanism 5 along with the movement of the steering wheel 3, to steer the steerable wheel 2. Further, the output rotation of the electric motor 18 is decelerated through the reduction gear mechanism 19, and is then converted into linear motion of the rack bar 14, to assist steering.

Figure 2:
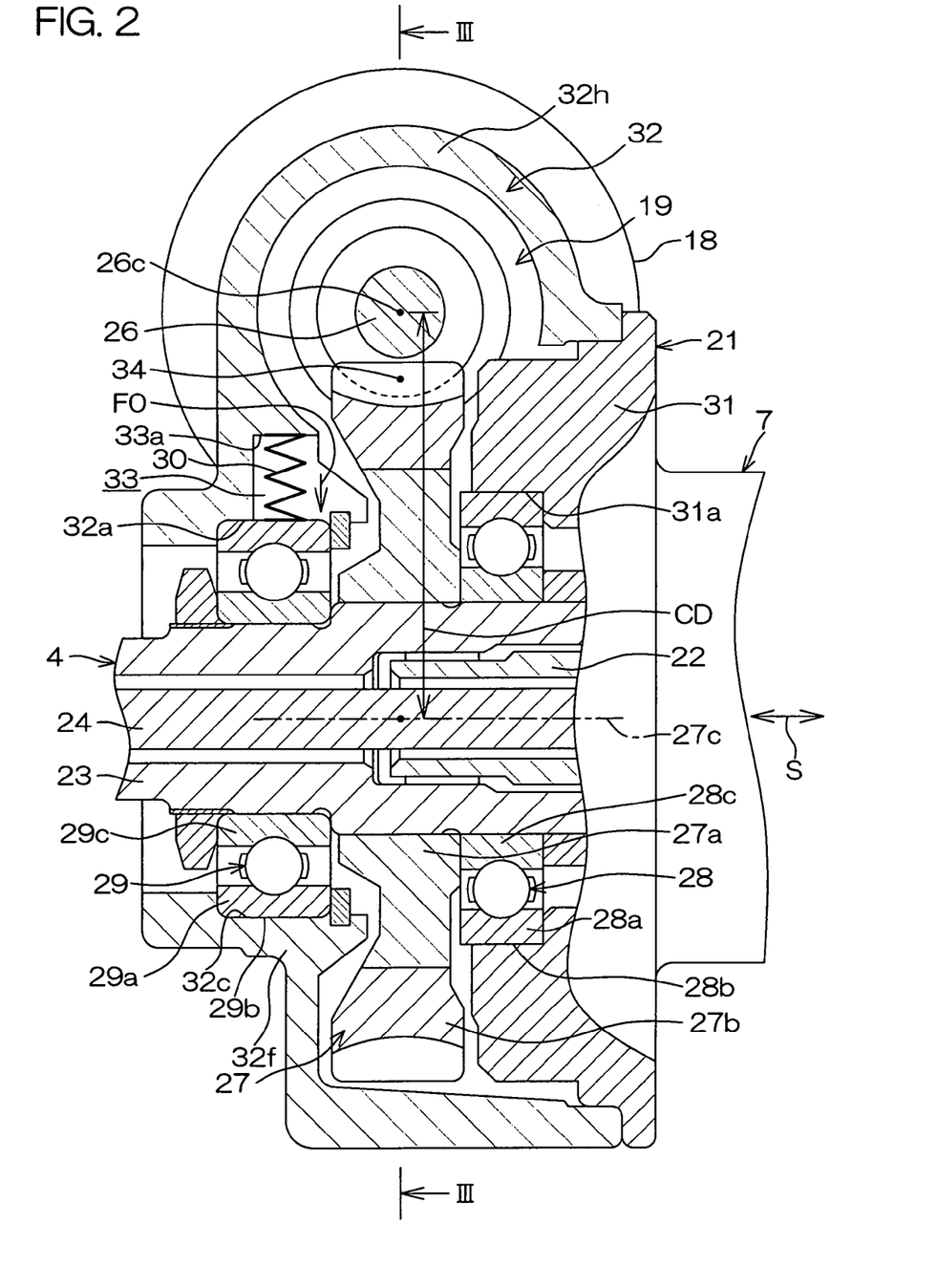
FIG. 2 is a sectional view of a principal part of the electric power steering apparatus.

FIG. 2 is a sectional view of a principal part of the electric power steering apparatus 1 shown in FIG. 1. Referring to FIGS. 1 and 2, the electric power steering apparatus 1 comprises first and second bearings 28 and 29 for rotatably supporting the output shaft 23 and an urging member 30 for urging the second bearing 29. The first and second bearings 28 and 29 are held by the housing 21. The housing 21 accommodates the above-mentioned reduction gear mechanism 19.

The housing 21 is formed of an aluminum alloy, for example, and is attached to the vehicle body 9. The housing 21 has a sensor housing 31 serving as a first housing and a gear housing 32 serving as a second housing. The sensor housing 31 and the gear housing 32 are fitted into each other.

The housing 21 has a bearing holding hole 31a provided at a lower end of the sensor housing 31 for holding the first bearing 28 and a bearing holding hole 32a provided in the gear housing 32 for holding the second bearing 29. The housing 21 rotatably supports the output shaft 23 through the first and second bearings 28 and 29.

A recess 33 serving as a holder for holding the urging member 30 is formed on the inner periphery of the bearing holding hole 32a in the housing 21.

The recess 33 is arranged in a portion in the closest proximity to the worm shaft 26 in the bearing holding hole 32a. The recess 33 extends by a predetermined length in a radial direction of the output shaft 23 and a direction in which the worm shaft 26 and the worm wheel 27 are aligned. The recess 33 is opened into the bearing holding hole 32a. The recess 33 has a bottom 33a serving as a receiving portion abutted against an end of the urging member 30 for receiving the end.

The first bearing 28 and the second bearing 29 are arranged on both sides in an axial direction S of the output shaft 23 with the worm wheel 27 sandwiched therebetween. The first bearing 28 and the second bearing 29 support the worm wheel 27 through the output shaft 23. Each of the first bearing 28 and the second bearing 29 comprises a ball bearing serving as a rolling bearing. Each of the first bearing 28 and the second bearing 29 has an inner ring, an outer ring, and a plurality of balls serving as rolling elements. Each of the inner ring, the outer ring, and the balls is formed of steel.

An outer periphery 28b of an outer ring 28a of the first bearing 28 is fitted into the bearing holding hole 31a by loose fitting, for example. The movement of the outer ring 28a of the first bearing 28 in the axial direction S relative to the housing 21 is restricted. An inner ring 28c of the first bearing 28 is fitted into the output shaft 23 by tight fitting.

An outer periphery 29b of an outer ring 29a of the second bearing 29 is fitted into the bearing holding hole 32a by loose fitting, for example. The movement of the outer ring 29a of the second bearing 29 in the axial direction S relative to the housing 21 is restricted. An inner ring 29c of the second bearing 29 is fitted into the output shaft 23 by tight fit.

The urging member 30 urges the outer periphery 29b of the outer ring 29a of the second bearing 29. The urging member 30 comprises a helical compression spring, for example. The urging member 30 is held within the recess 33 in an elastically deformed state by compression. One end of the urging member 30 is abutted against the bottom 33a of the recess 33. The other end of the urging member 30 is abutted against the outer periphery 29b of the outer ring 29a of the second bearing 29.

This causes the urging member 30 to press and urge the second bearing 29 in a direction away from the worm shaft 26. The urged second bearing 29 is received by a receiving portion 32c provided at a predetermined position on the inner periphery of the bearing holding hole 32a with the receiving portion 32c pressed. The receiving portion 32c is the farthest portion from a meshed portion 34 between the worm shaft 26 and the worm wheel 27 on the inner periphery of the bearing holding hole 32a.

The urging member 30 urges the second bearing 29 in a direction F0 in which a center-to-center distance CD between the worm shaft 26 and the worm wheel 27 increases. That is, the direction in which the urging member 30 urges the second bearing 29 is parallel to the radial direction of the output shaft 23 and the direction in which the worm shaft 26 and the worm wheel 27 are aligned. Specifically, the direction is perpendicular to both a center axis 26c of the worm shaft 26 and a center axis 27c of the worm wheel 27.

Here, the center-to-center distance CD between the worm shaft 26 and the worm wheel 27 is the shortest distance between the center axis 26c of the worm shaft 26 and the center axis 27c of the worm wheel 27.

Figure 3:
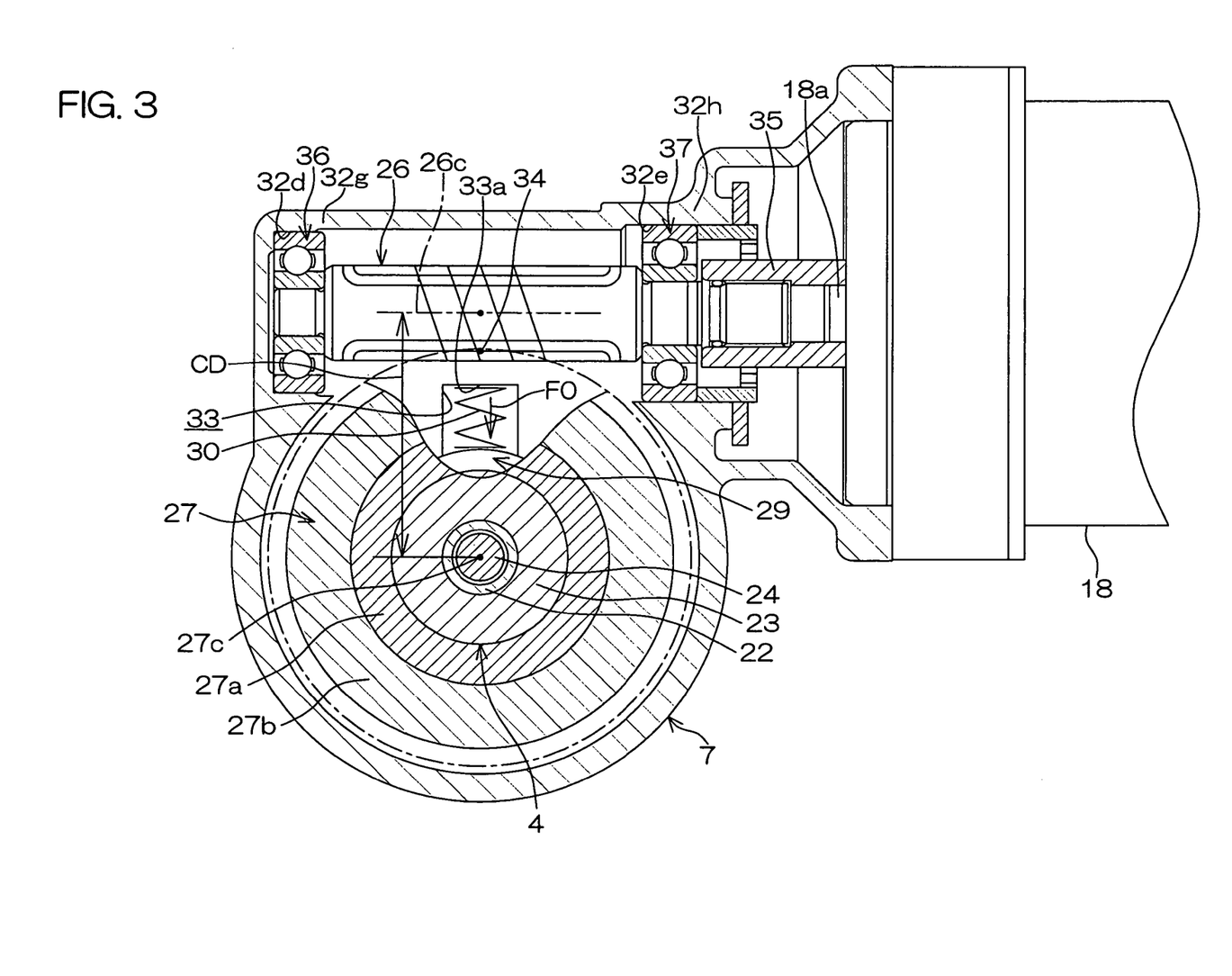
FIG. 3 is a sectional view taken along a line III-III shown in FIG. 2.

FIG. 3 is a sectional view taken along a line III-III shown in FIG. 2. Referring to FIG. 3, the worm wheel 27 has an annular metal core 27a and an annular tooth formation portion 27b surrounding the metal core 27a.

The metal core 27a is formed in an annular shape of a metal, for example, an aluminum alloy. The inner periphery of the metal core 27a is connected to the output shaft 23 so as to be rotatable along with the output shaft 23 and so as to be axially unmovable. The metal core 27a is inserted into a metal mold at the time of resin molding of the tooth formation portion 27b, for example. The metal core 27a and the tooth formation portion 27b are fixed to and integrated with each other by the resin molding with the metal core 27a inserted in the metal mold. This allows the metal core 27a and the tooth formation portion 27b to be rotatable along with each other.

The tooth formation portion 27b is formed of a synthetic resin member. The synthetic resin member may be a synthetic resin member containing polyamide resin or a synthetic resin member composed of polyamide resin, for example.

It is preferable that reinforced fibers such as glass fibers are not mixed in the synthetic resin member used for the tooth formation portion 27b. In a case where the reinforced fibers are not mixed, there is the following advantage when the worm wheel 27 is manufactured. That is, when gear cutting processing is performed by a hob serving as a gear cutting tool, abrasion of the hob can be reduced. Consequently, the life of the tool can be lengthened, so that the manufacturing cost of the worm wheel 27 can be reduced.

In a case where the reinforced fibers are not mixed, there are the following advantages when the worm wheel 27 is used. That is, the abrasion loss of gear teeth of the worm shaft 26 meshed with gear teeth of the worm wheel 27 can be suppressed to a small value, and a sound of mesh between the gear teeth can be reduced.

The coefficient of linear expansion of the synthetic resin member in a case where it contains polyamide resin and does not contain glass fibers becomes higher than the coefficient of linear expansion of the synthetic resin member in a case where it contains glass fibers and polyamide resin.

The synthetic resin member used for the tooth formation portion 27b is selected such that the coefficient of linear expansion of the synthetic resin member is higher than the coefficient of linear expansion of a material (an aluminum alloy in the present embodiment) for the gear housing 32. A plurality of gear teeth are formed on the outer periphery of the tooth formation portion 27b.

The worm shaft 26 is formed of a metal, for example, steel. The worm shaft 26 has gear teeth on its outer periphery. The worm shaft 26 is meshed with the worm wheel 27. The worm shaft 26 extends in a transverse direction as a horizontal direction, and is arranged above the worm wheel 27. The worm shaft 26 is driven by the electric motor 18 for steering assist. The worm shaft 26 is connected to the output shaft 18a in the electric motor 18 so as to be rotatable along with the output shaft 18a through a spline coupling 35.

Furthermore, the electric power steering apparatus 1 has a third bearing 36 and a fourth bearing 37 for rotatably supporting the worm shaft 26. Each of the third bearing 36 and the fourth bearing 37 comprises a ball bearing serving as a rolling bearing, for example. Each of the third bearing 36 and the fourth bearing 37 has an inner ring, an outer ring, and a plurality of balls serving as rolling elements. The inner ring, the outer ring, and the balls are formed of steel. The third bearing 36 is held by a bearing holding hole 32d in the gear housing 32. The fourth bearing 37 is held by a bearing holding hole 32e in the gear housing 32.

Referring to FIGS. 2 and 3, the gear housing 32 has three hole formation portions 32f, 32g, and 32h. The hole formation portions 32f, 32g, and 32h respectively form the bearing holding holes 32a, 32d, and 32e. Each of the hole formation portions 32f, 32g, and 32h has an annular shape. The three hole formation portions 32f, 32g, and 32h are connected to one another, and are integrally formed by a single member.

The magnitude of an urging force produced by the urging member 30 is set to such a value that the movement of the second bearing 29 within the bearing holding hole 32a is restricted when the second bearing 29 receives an external force. The magnitude of the urging force produced by the urging member 30 will be described on the basis of specific examples 1, 2, and 3, described below.

SPECIFIC EXAMPLE 1

Referring to FIGS. 1 and 2, the worm shaft 26 extends in a transverse direction, and is positioned just above (or just below) the worm wheel 27 in the specific example 1. Further, the power transmission shaft 10 in the intermediate shaft 6 is a non-telescopic shaft.

The steerable wheel 2 receives an external force from a road surface. The external force is transmitted to the second bearing 29 through the steering mechanism 5, the intermediate shaft 6, and the output shaft 23 in the first steering shaft 4. The external force is exerted to push and pull the power transmission shaft 10 of the intermediate shaft 6 in its axial direction. The maximum value of an external force received by the power transmission shaft 10 in its axial direction is set to 640 N. Note that this value is used for a durability test and is so large that the external force is not exerted at the time of normal use of the electric power steering apparatus 1.

In FIG. 1, the maximum value of an angle DA formed between a center axis 10a of the power transmission shaft 10 of the intermediate shaft 6 and a center axis 4a of the first steering shaft 4 is set to 30 degrees. A force exerted in the axial direction of the power transmission shaft 10 is transmitted to the first steering shaft 4 with the first steering shaft 4 and the power transmission shaft 10 connected to each other such that the center axes 10a and 4a form an angle of 30 degrees. The force transmitted to the first steering shaft 4 is exerted in an axial direction and a radial direction of the first steering shaft 4.

A force component exerted in the radial direction of the first steering shaft 4 is exerted on the second bearing 29 in a radial direction of the second bearing 29. A maximum value G1 of the force exerted on the second bearing 29 in the radial direction of the second bearing 29 is expressed by the following equation:

$$G1 = 640N \times \sin(30°)$$

$$G1 = 320N$$

On the other hand, the urging member 30 urges the second bearing 29 parallel to the force exerted in the radial direction of the second bearing 29 from the first steering shaft 4. In order that the second bearing 29 does not move when it receives an external force from the first steering shaft 4, the magnitude of an urging force produced by the urging member 30 must be not less than the above-mentioned maximum value G1 (320N) of the force exerted in the radial direction of the second bearing 29.

SPECIFIC EXAMPLE 2

A specific example 2 differs from the specific example 1 in that the power transmission shaft 10 in the intermediate shaft 6 comprises a telescopic shaft. In the specific example 2 in which the power transmission shaft 10 comprises a telescopic shaft, a force from the power transmission shaft 10 received by the first steering shaft 4 is reduced to approximately one-third of that in the specific example 1.

For example, a maximum value G2 of a force exerted in a radial direction of the second bearing 29 from the first steering shaft 4 is 100 N. In order that the second bearing 29 does not move when it receives an external force from the first steering shaft 4, therefore, the magnitude of an urging force produced by the urging member 30 must be not less than the maximum value G2 of the above-mentioned force, i.e., a magnitude of not less than 100 N.

SPECIFIC EXAMPLE 3

In a specific example 3, the worm shaft 26 extends in a longitudinal direction, and is arranged right beside the worm wheel 27. Further, the power transmission shaft 10 in the intermediate shaft 6 comprises a telescopic shaft.

In the specific example 3, a maximum value G3 of a force exerted in a radial direction of the second bearing 29 from the first steering shaft 4 is also 100 N, as in the specific example 2. On the other hand, the urging member 30 urges the second bearing 29 in a direction perpendicular to the direction of the force.

In order that the second bearing 29 does not move when it receives an external force from the first steering shaft 4, therefore, not less than the half of the above-mentioned maximum value G3 (100N), i.e., a magnitude of not less than 50 N is sufficient as the magnitude of an urging force produced by the urging member 30.

When the magnitude of the urging force produced by the urging member 30 is set in each of the above-mentioned specific examples 1, 2, and 3, the magnitude of a steering assist force (an output of the electric motor 18) need not be considered. The reason for this is that when the electric motor 18 produces the steering assist force, a reaction force of mesh from the worm shaft 26 received by the worm wheel 27 urges the second bearing 29 in the direction F0 in which the center-to-center distance CD between the worm shaft 26 and the worm wheel 27 increases. That is, the above-mentioned reaction force of mesh is exerted in the same direction as the direction of urging by the urging member 30.

When the magnitude of the urging force produced by the urging member 30 is set, the expansion of the housing 21 due to temperature changes need not be considered. For example, the outer diameter of the outer ring of the second bearing 29 is 42 mm, and the coefficient of linear expansion of the steel composing the outer ring is $12 \times 10^{-6}(1/°C.)$. The coefficient of linear expansion of the aluminum alloy composing the housing 21 is $23 \times 10^{-6}(1/°C.)$.

A temperature range supposed when the electric power steering apparatus is employed is $-30°$ C. to $+80°$ C. The temperature difference between the lower limit and the upper limit of the temperature range is $110°$ C. When the temperature difference of $110°$ C. occurs, a dimensional change amount $\Delta L$ between the outer ring of the second bearing 29 and the housing 21 is expressed by the following equation:

$$\Delta L = 42 \times (23-12) \times 10^{-6} \times 110$$

$$\Delta L = 0.051 \text{ mm}$$

It is supposed that a clearance in this amount (0.051 mm) occurs between the outer ring of the bearing 29 and the housing 21. In this case, the set length of the compression spring serving as the urging member 30 is changed only by the above-mentioned amount (0.051 mm). However, the amount is very small. Consequently, the urging force produced by the urging member 30 is hardly affected.

The electric power steering apparatus 1 according to the present embodiment comprises the worm shaft 26 serving as a driving gear driven by the electric motor 18 for steering assist and the worm wheel 27 serving as a driven gear rotated along with the first steering shaft 4 connecting to the steering mechanism 5 and meshed with the worm shaft 26. Further, the electric power steering apparatus 1 has the first and second bearings 28 and 29 for rotatably supporting the first steering shaft 4 on the both sides thereof with the worm wheel 27 serving as a driven gear sandwiched therebetween in the axial direction S.

The electric power steering apparatus 1 comprises the housing 21 having the bearing holding holes 31a and 32a for holding the first and second bearings 28 and 29. The recess 33 is formed in the bearing holding hole 32a corresponding to the second bearing 29, and the urging member 30 is accommodated in the recess 33. The urging member 30 urges the second bearing 29 in the direction F0 in which the center-to-center distance CD between the worm shaft 26 and the worm wheel 27 increases.

Thus, according to the present embodiment, the urging member 30 urges the second bearing 29 in the direction F0 in which the center-to-center distance CD increases. As a result, the urged second bearing 29 is pressed against the receiving section 32c on the inner periphery of the bearing holding hole 32a and positioned therein.

On the other hand, the reaction force of mesh received by the worm wheel 27 serving as a driven gear from the worm shaft 26 serving as a driving gear urges the second bearing 29 in the direction F0 in which the center-to-center distance CD increases.

Even if a very small clearance exists between the inner periphery of the bearing holding hole 32a and the outer ring of the second bearing 29, therefore, the position of the second bearing 29 is prevented from being undesirably shifted within the bearing holding hole 32. As a result, the amount of backlash between the worm shaft 26 and the worm wheel 27 can be properly maintained over a long time period.

In other words, the urging member 30 urges the second bearing 29 in the direction F0 in which the center-to-center distance CD increases, so that the position of the second bearing 29 is not shifted within the bearing holding hole 32a when the second bearing 29 receives the reaction force of mesh between the worm shaft 26 and the worm wheel 27 (a force in a direction in which the worm shaft 26 and the worm wheel 27 are spaced away from each other). As a result, the change in backlash can be restrained for a long time period.

Consequently, the increase in rotational resistance at the time of mesh between the worm shaft 26 and the worm wheel 27 can be restrained. Further, noises caused by a tooth striking sound can be restrained. Note that the effect can be obtained irrespective of respective materials for the worm wheel 27 and the housing 21.

The urging member 30 urges the second bearing 29 in the direction F0 in which the center-to-center distance CD increases. When the amount of expansion of the worm wheel 27 due to temperature rise is larger than the amount of expansion of the housing 21, therefore, the amount of backlash between the worm shaft 26 and the worm wheel 27 is not excessively reduced. Consequently, the increase in rotational resistance between the worm shaft 26 and the worm wheel 27 can be restrained irrespective of temperature changes. As a result, a good steering feeling is obtained.

Specifically, the worm wheel 27 serving as a driven gear has the metal core 27a made of a metal and the tooth formation portion 27b made of synthetic resin, for example. The housing 21 is made of a metal. The coefficient of linear expansion of the tooth formation portion 27b is made higher than the coefficient of linear expansion of the housing 21. As a result, consider a case where the amount of expansion of the worm wheel 27 at the time of temperature rise is larger than the amount of expansion of a portion, opposite to the worm wheel 27, of the housing 21.

In this case, an amount obtained by subtracting the amount of expansion of the housing 21 from the amount of expansion of the tooth formation portion 27b corresponds to the amount of decrease in the backlash between the worm shaft 26 and the worm wheel 27.

Figure 4:
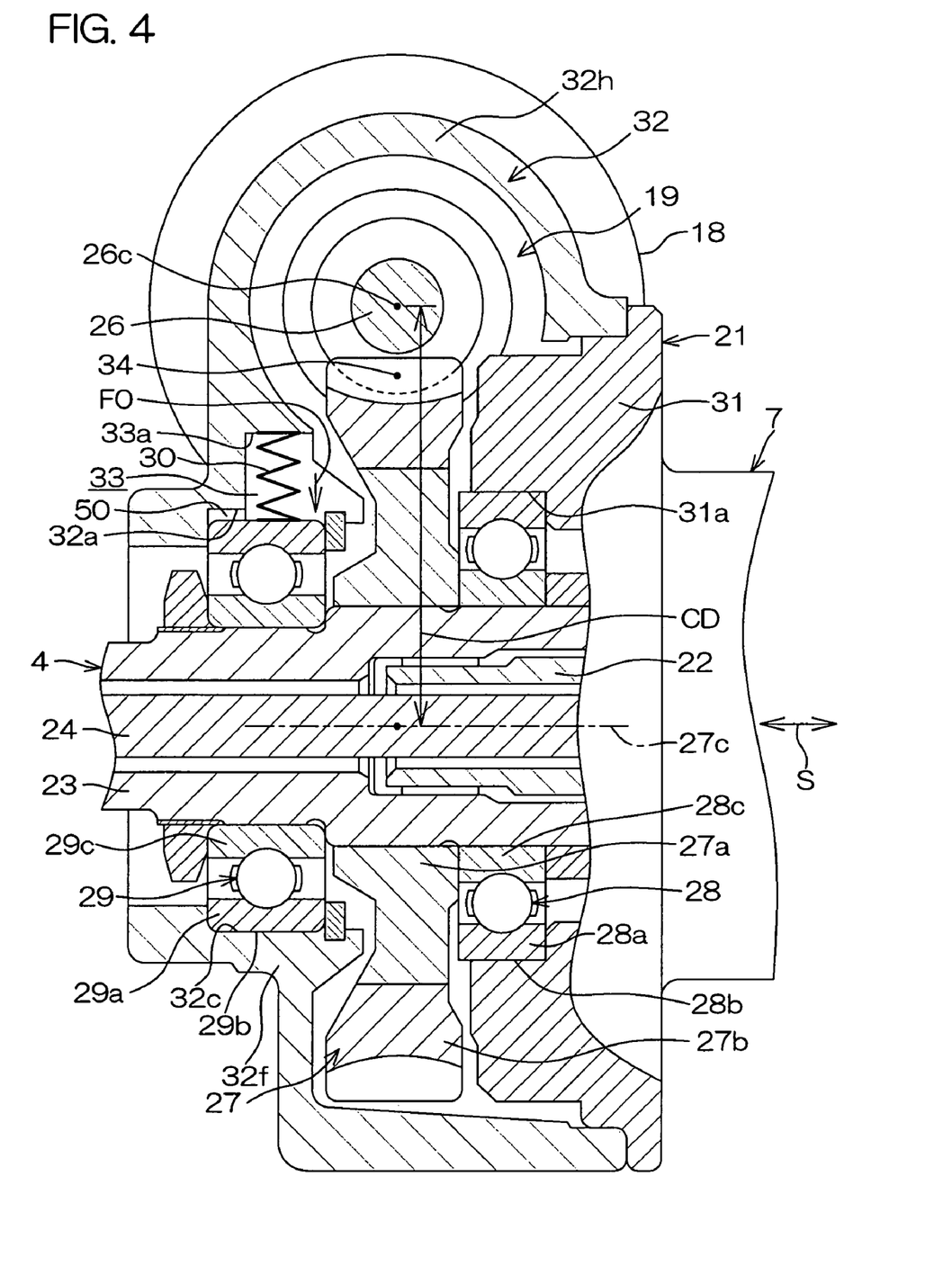
FIG. 4 is a sectional view of the principal part of the electric power steering apparatus at the time of temperature rise.

On the other hand, the inner diameter of the bearing holding hole 32a is enlarged by the thermal expansion of the housing 21 at the time of temperature rise. As a result, a very small clearance 50 tends to occur between the inner periphery of the bearing holding hole 32a and the outer periphery 29b of the outer ring 29a of the second bearing 29, as shown in FIG. 4.

The second bearing 29 is received by the receiving portion 32c serving as a part of the inner periphery of the bearing holding hole 32a in a state where it is urged by the urging member 30 in a direction away from the worm shaft 26. That is, the second bearing 29 enters a state where it is offset at a position where the center-to-center distance CD becomes the largest within the bearing holding hole 32a.

Consequently, the thermal expansion of the housing 21 can be effectively utilized by using the urging member 30. As a result, the amount of decrease in the backlash between the worm shaft 26 and the worm wheel 27 at the time of temperature rise can be reduced. On the other hand, the amount of increase in the backlash can be reduced at the time of temperature drop. This allows the amount of change in the backlash due to temperature changes to be restrained.

That is, in a case where the urging member 30 exists, a portion of the housing 21 which can contribute to the restraint of the amount of change in the backlash is a portion from a position of the meshed portion 34 between the worm shaft 26 and the worm wheel 27 to a position of the receiving portion 32c that receives the second bearing 29 within the bearing holding hole 32a.

On the other hand, in a conventional case where the urging member 30 does not exist, the thermal expansion or the like in the above-mentioned portion of the housing 21 cannot be effectively utilized.

In the present embodiment, the worm wheel 27 serving as a driven gear includes the tooth formation portion 27b serving as a member having a higher coefficient of linear expansion than the coefficient of linear expansion of the housing 21. In this case, the backlash at the time of temperature rise tends to be excessively small. However, the urging member 30 urges the second bearing 29 in the direction in which the decrease in the backlash is restrained so that the above-mentioned tendency can be alleviated. When the temperature rises, therefore, a resistance in a case where the worm shaft 26 and the worm wheel 27 are rotated can be suppressed to a small value.

A modified example can be considered with respect to the present embodiment, as follows. In the following, description will be centered at points different from those in the above-mentioned embodiment, and the same constituent elements are assigned the same reference numerals, and hence, the description thereof is not repeated.

Figure 5:
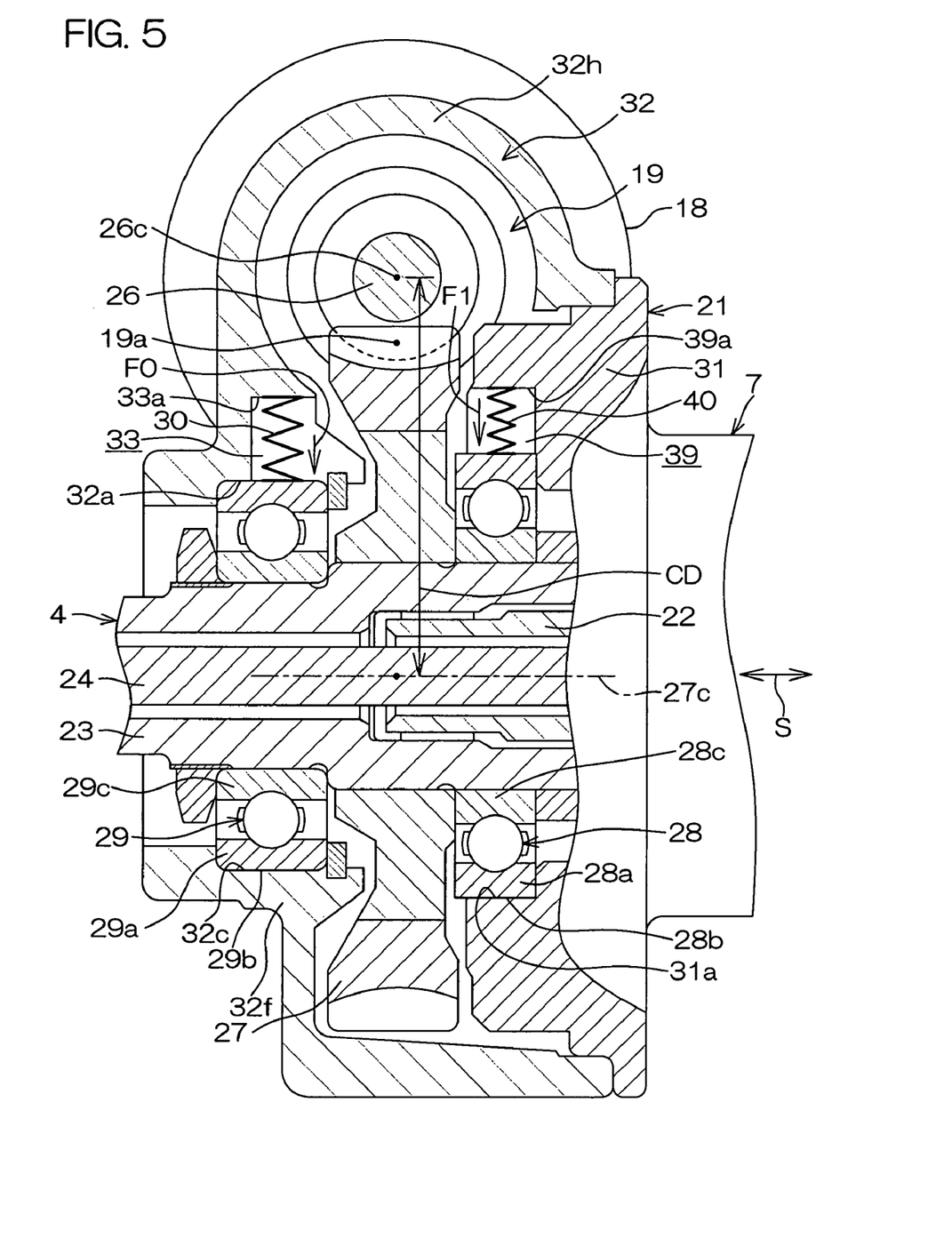
FIG. 5 is a sectional view of a principal part of an electric power steering apparatus according to a second embodiment of the present invention.

FIG. 5 is a sectional view of a principal part of an electric power steering apparatus according to a second embodiment of the present invention. The second embodiment shown in FIG. 5 differs from the first embodiment shown in FIG. 2 in the following manner. That is, there are provided as an urging member an urging member 40 for urging a first bearing 28 in a first urging direction F1 as a direction in which a center-to-center distance CD increases, and an urging member 30 for urging a second bearing 29 in a second urging direction F0 as a direction in which the center-to-center distance CD increases. The direction F1 and the direction F0 are parallel to each other.

The urging member 40 for urging the first bearing 28 will be hereinafter referred to as a first urging member 40. On the other hand, the urging member 30 for urging the second bearing 29 will be referred to as a second urging member 30.

A recess 39 is provided on the inner periphery of a bearing holding hole 31a in a sensor housing 31 in a housing 21. The first urging member 40 comprises a coiled spring, for example, and is accommodated and held in the recess 39 in an elastically compressed state. One end of the first urging member 40 is abutted against a bottom 39a of the recess 39, and the other end is abutted against an outer periphery 28b of an outer ring 28a of the first bearing 28.

Figure 6:
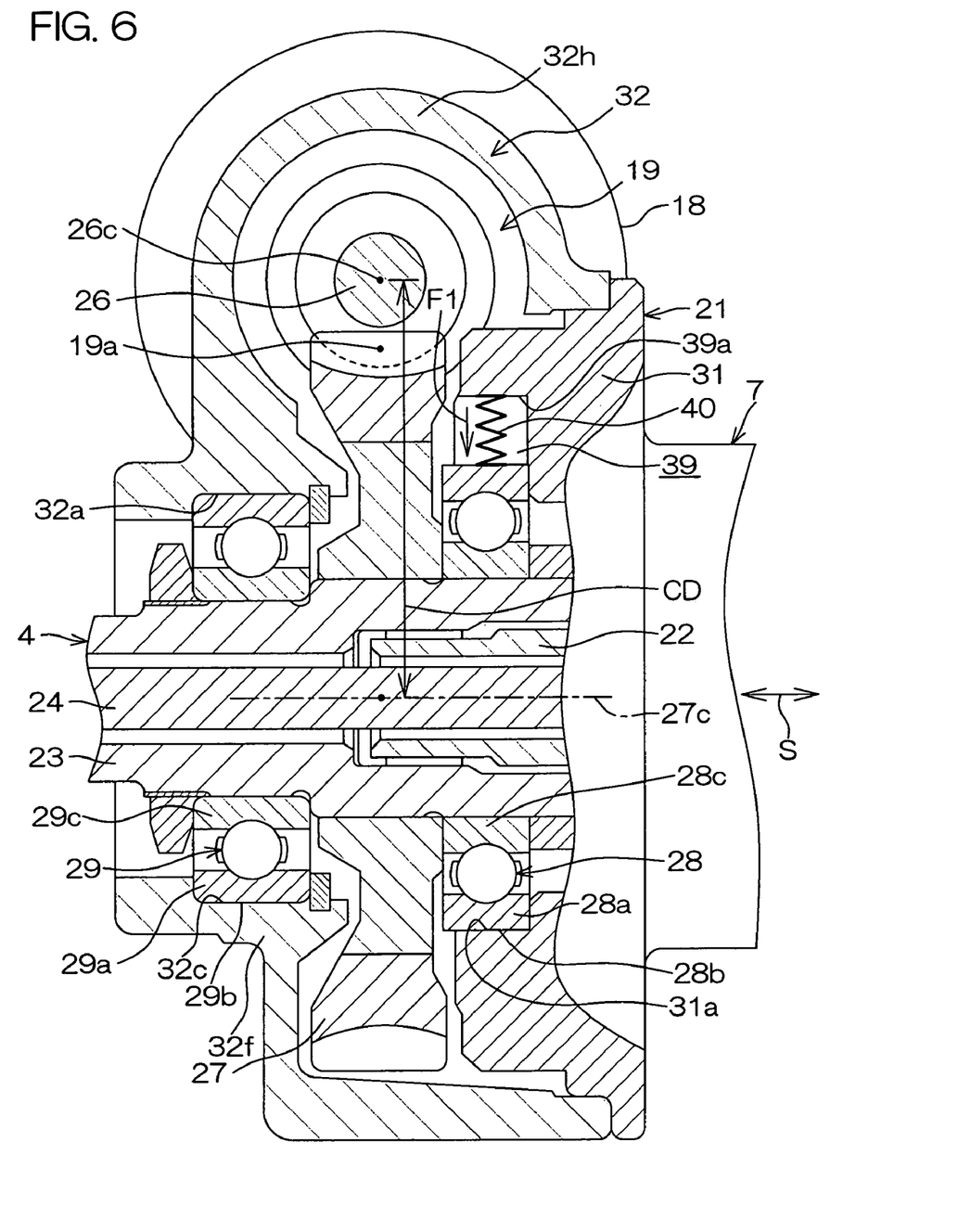
FIG. 6 is a sectional view of a principal part of an electric power steering apparatus according to a third embodiment of the present invention.

In a third embodiment shown in FIG. 6, the second urging member 30 shown in FIG. 5 is not employed. In the third embodiment, only a first urging member 40 for urging a first bearing 28 is provided as an urging member.

In the second and third embodiments, the same function and effect as those in the first embodiment can be also produced.

In short, the urging member may be provided in bearing holding holes 31a and 32a corresponding to at least one of first and second bearings 28 and 29. The urging members 30 and 40 are not limited to a coiled spring. For example, they may be a spring in another shape, e.g., a plate spring or a disc spring. Further, the urging members 30 and 40 may be a rubber member in a stick shape, for example, for elastically urging the corresponding bearings 28 and 29.

Although in the electric power steering apparatus, the electric motor 18 and the reduction gear mechanism 19 are provided in the steering column 7, the present invention is not limited to this configuration. For example, the electric motor 18 and the reduction gear mechanism 19 may be provided in the steering mechanism 5, for example.

While preferred embodiments of the present invention have been described above, it is to be understood that variations, modifications and equivalents will be apparent to those skilled in the art. The scope of the present invention, therefore, is to be the following claims and equivalents thereof.

The present application corresponds to Japanese Patent Application No. 2006-219600 filed with the Japanese Patent Office on Aug. 11, 2006, the disclosure of which is herein incorporated by reference.

What is claimed is:

1. An electric power steering apparatus comprising:
   a steering member operable by a driver;
   a driving gear driven by an electric motor for steering assistance;
   a driven gear meshed with the driving gear;

a steering shaft rotated along with the driven gear, the steering shaft being connected to the steering member;

a first bearing and a second bearing for rotatably supporting the steering shaft;

a housing accommodating the driving gear, the driven gear, the first bearing, and the second bearing;

an urging member arranged in a recess provided in the housing for urging at least one of the first bearing and the second bearing in a direction in which a center-to-center distance between the driving gear and the driven gear increases;

an intermediate shaft; and a steering mechanism including a pinion shaft and a rack bar, the pinion shaft being connected to the steering shaft through the intermediate shaft, the rack bar being engaged with the pinion shaft, wherein there are provided as the urging member a first urging member for urging the first bearing in a first urging direction as the direction in which the center-to-center distance increases, and a second urging member for urging the second bearing in a second urging direction as the direction in which the center-to-center distance increases, and the first direction and the second direction are parallel to each other.

2. The electric power steering apparatus according to claim 1, wherein
the driving gear includes a worm, and
the driven gear includes a worm wheel.

3. The electric power steering apparatus according to claim 1, wherein
the housing is formed with a first bearing holding hole for holding the first bearing and a second bearing holding hole for holding the second bearing, and
the recess communicates with at least one of the first bearing holding hole and the second bearing holding hole.

4. The electric power steering apparatus according to claim 1, wherein
the driven gear includes a member having a higher coefficient of thermal expansion than a coefficient of thermal expansion of the housing.

5. The electric power steering apparatus according to claim 4, wherein
each of the first bearing and the second bearing has a lower coefficient of thermal expansion than the coefficient of thermal expansion of the housing.

6. The electric power steering apparatus according to claim 5, wherein
the housing is formed of a member containing aluminum, and
the first bearing and the second bearing are formed of a member containing iron.

7. The electric power steering apparatus according to claim 1, wherein
the driven gear has a metal member and a tooth formation portion held so as to be rotatable along with the metal member, and
the tooth formation portion contains synthetic resin having a higher coefficient of thermal expansion than the coefficient of thermal expansion of the housing.

8. An electric power steering apparatus, comprising:
a driving gear driven by an electric motor for steering assistance;
a driven gear meshed with the driving gear;
a steering shaft rotated along with the driven gear;
a first bearing and a second bearing for rotatably supporting the steering shaft;
a housing accommodating the driving gear, the driven gear, the first bearing, and the second bearing; and
an urging member disposed between at least one of the first and second bearings and a bottom of a recess provided in the housing for urging at least one of the first bearing and the second bearing in a direction in which a center-to-center distance between the driving gear and the driven gear increases, wherein
there are provided as the urging member a first urging member for urging the first bearing in a first urging direction as the direction in which the center-to-center distance increases, and a second urging member for urging the second bearing in a second urging direction as the direction in which the center-to-center distance increases, and
the first direction and the second direction are parallel to each other.

9. The electric power steering apparatus according to claim 8, further comprising
a steering member operated by a driver, wherein
the steering shaft is connected to the steering member.

10. The electric power steering apparatus according to claim 8, wherein
the driving gear includes a worm, and
the driven gear includes a worm wheel.

11. The electric power steering apparatus according to claim 8, wherein
the housing is formed with a first bearing holding hole for holding the first bearing and a second bearing holding hole for holding the second bearing, and
the recess communicates with at least one of the first bearing holding hole and the second bearing holding hole.

12. The electric power steering apparatus according to claim 8, wherein
the driven gear includes a member having a higher coefficient of thermal expansion than a coefficient of thermal expansion of the housing.

13. The electric power steering apparatus according to claim 12, wherein
each of the first bearing and the second bearing has a lower coefficient of thermal expansion than the coefficient of thermal expansion of the housing.

14. The electric power steering apparatus according to claim 13, wherein
the housing is formed of a member containing aluminum, and
the first bearing and the second bearing are formed of a member containing iron.

15. The electric power steering apparatus according to claim 8, wherein
the driven gear has a metal member and a tooth formation portion held so as to be rotatable along with the metal member, and
the tooth formation portion contains synthetic resin having a higher coefficient of thermal expansion than the coefficient of thermal expansion of the housing.

* * * * *